Jan. 16, 1945.  L. EDELMANN  2,367,268
HYDROMETER FLOAT
Filed July 2, 1943

Inventor
Leo Edelmann
By Lloyd W. Bates
his Attorney

Patented Jan. 16, 1945

2,367,268

UNITED STATES PATENT OFFICE 2,367,268

HYDROMETER FLOAT

Leo Edelmann, Chicago, Ill.

Application July 2, 1943, Serial No. 493,264

6 Claims. (Cl. 73—33)

My invention relates to improvements in hydrometer floats, and particularly to a float structure intended and adapted for use in testing two or more liquid solutions having specific gravity above and below the specific gravity of water.

An object of this invention is to provide a float element that can be used in testing automobile radiator anti-freeze solutions, and the like, to give a wide useful range of specific gravity indications and to eliminate the necessity of increasing the length of the scales above and below the specific gravity point of water to take in or accommodate a length of scale that would comprehend specific gravity indications or readings not ordinarily useful or practical in antifreeze solutions.

Another object is to provide a hydrometer float element embodying scale indication portions for liquid solutions lighter than water and for liquid solutions heavier than water, with the divisions on the indicating portions of substantially equal spacing on the two scales, and with the portion of the scales above and below the specific gravity point of water eliminated and compensated for whereby the float element and the stem thereof can be kept within and confined to a minimum space or length so that the float element is adaptable for use in a syringe type of hydrometer without necessity of increasing the overall length of the hydrometer proportionate to the increase in range of the scale readings or indications.

Still another purpose of my invention is to provide a hydrometer float that can be made entirely of glass, and which in its finished form is of substantially unitary construction so that the possibility of liquid finding its way into the float element is precluded.

Yet another purpose is to so construct the float element that compensations can be made to increase or decrease the gap in the effective scale indications or readings above and below the specific gravity point of water.

With the above and other objects in view, some of which will be apparent to those skilled in the art, and others of which are inherent in the construction and use of the hydrometer float, my invention includes certain novel features of construction and combinations and arrangements of parts which will be hereinafter set forth in connection with the drawing and then pointed out in the claims.

In the drawing:

Fig. 2 is a diagrammatic view showing the specific gravity range as compensated for.

Figure 1:
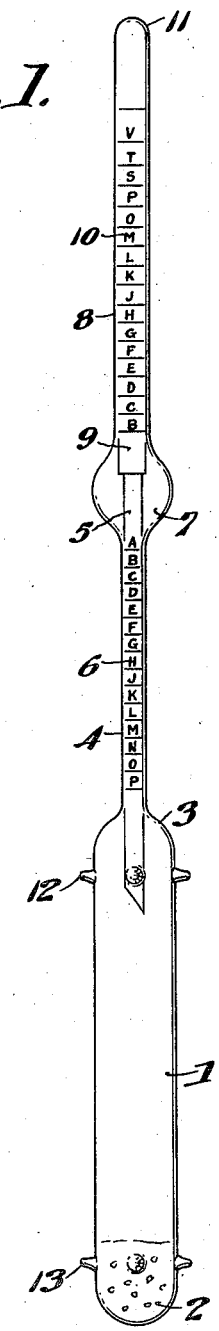
Figure 1 is a view in side elevation showing a hydrometer float element containing an embodiment of my invention.

The float bulb portion 1 is here shown as being of standard form and construction, and design, and it will be appreciated that this is capable of variation in construction and shape, as may be desired. This float bulb portion 1 has the weighting material 2 in its lower end, and the bulb portion is drawn in and reduced at its upper end, as at 3. A gauge scale stem 4, which is of relatively smaller diameter is fused or connected with the drawn in portion at 3, and has therein a scale sheet or portion 5 showing scale readings or indications 6 for a liquid heavier than water. At the top of the gauge or scale stem 4 a bulbous portion 7 is provided, which portion 7 occupies a relative position with respect to the scale indications 6 corresponding with the specific gravity of water. Above this bulbous portion 7, an upper gauge or scale stem portion 8 is provided, and this portion 8 has therein an upper scale sheet or portion 9 with indicating markings 10 thereon adapted for use in testing liquid solutions lighter than water. The upper gauge or scale stem portion 8 is preferably made of larger diameter than the lower gauge or scale stem portion 4, and this portion 8 is closed and sealed at its upper end, as at 11.

The float bulb portion 1 can be provided with one or more series of radially outwardly extending centering and friction reducing points or beads, as at 12 and 13, and for convenience in use in a hydrometer liquid barrel of the usual form, it is perhaps preferable that the bulbous portion 7 be of an external diameter substantially the same or less than the float bulb portion 1, or the overall dimensions of the centering and friction reducing points or beads 12 and 13.

Figure 2:
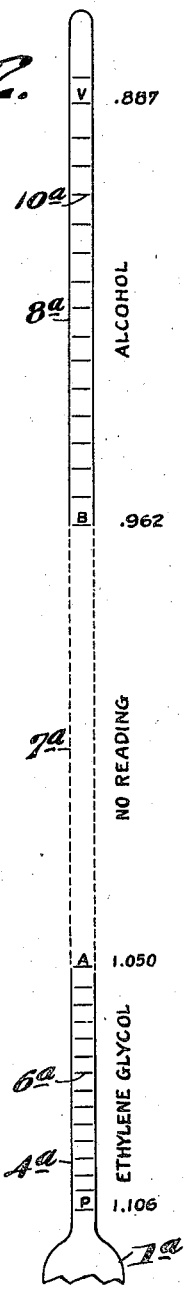

In the present instance I have illustrated an embodiment of my invention in a hydrometer float element adapted for use in testing radiator anti-freeze solutions of the ethylene glycol type, heavier than water, and solutions of the alcohol type, lighter than water, and Fig. 2 diagrammatically illustrates a float gauge stem such as would ordinarily be required to accomplish tests within the wide range above and below the specific gravity point of water, desired to be tested with this instrument. As illustrated in Fig. 2, the body portion 1—a has a stem upstanding therefrom constituting the lower gauge stem portion 4—a and the upper gauge stem portion 8—a, with an intermediate compensating portion 7—a, which is within an area above and below the specific gravity range of water, and which range is not considered practicable for testing solutions of antifreeze liquids. The lower portion 4—a has a scale sheet or strip 6—a therein and the upper stem portion has a scale or sheet 10—a displayed therein.

As is indicated, the specific gravity indications cover a range from substantially .887 to 1.106, thus giving a very wide range so that liquid antifreeze solutions or other liquid solutions can be tested at a wide variation of temperatures, some of which temperatures may change the specific gravity characteristics of the liquid solutions beyond limits that might ordinarily be expected. However, as is indicated in Fig. 2, the useful range in the alcohol or lighter scale is ordinarily between .887 and .962, and the useful range for the ethylene glycol scale is between 1.050 and 1.106. In actual practice it has been found that readings or indications of the specific gravity of the lighter and heavier liquids appreciably above and below the specific gravity point of water have little or no utility, when testing radiator antifreeze solutions; and, it has been found practicable to eliminate all readings between approximately .962 and 1.050, more or less, as is indicated by the dotted line portion in the drawing.

Thus, with the gauge or scale stem of uniform diameter the scale markings in the portion 6—a are relatively closer together than in the scale portion 8—a, thus requiring lengthening of the scale portion 8—a; and, at the same time the portion 7—a, which shows no scale readings, is of relatively greater length than either of the scale displaying portions. I have found that quite accurate specific gravity indications can be obtained when the scale markings are placed in four point spacing, and with my improved hydrometer float structure this can be accomplished on both the lower and upper indicating scale portions, and the spacings can be kept sufficiently far apart to give ready and accurate readings, without increasing the length of the gauge or stem portion, and consequently the overall length of the float element, beyond a practical and useful dimension.

In the adaptation as illustrated in Figure 1, the stem portion 4 is made of relatively small diameter and the indicating markings, even though only four points of specific gravity apart, can be held to such limits that the length of the stem is not unduly increased for the wide specific gravity range as covered, and at the same time the gauge markings and indications can be readily seen and read. The bulbous portion 7 is of such volumetric size that it will represent a displacement corresponding to the displacement of the portion 7—a, as indicated in Fig. 2; and, the gauge or scale stem portion 8 is increased in diameter so that its volumetric displacement will substantially equal the displacement of the portion 8—a, as shown in Fig. 2. By increasing the diameter of the gauge or stem portion 8, it is possible to shorten the space or distance between the gauge markings, while still maintaining the four point spacing, and thus, the individual spaces of the scale sheet 10 will correspond more nearly to the individual spaces on the scale sheet 6.

By constructing my improved hydrometer in this way it is possible to considerably shorten the overall length of the complete gauge or scale stem portion, and to at the same time keep the desired range and have the scale markings and the indications therefor of such spacing and size that they can be readily viewed and read. For example, in the present instance the scale portion as illustrated in Fig. 2 is approximately eight and five-eighths inches overall, whereas the scale in the disclosure in Figure 1 is substantially only five inches, and the effective and useful range is substantially the same. In consequence, the liquid and float receiving barrel of the hydrometer and the overall length of the complete hydrometer can be proportionately shortened, and at the same time, the float element with my improved stem structure can be more readily handled, weighted and calibrated during manufacture, and is less subject to breakage and damage when in use.

Obviously, the bulbous portion 7 can be made of smaller diameter and greater length, and can be varied in shape and design, to suit different requirements and conditions of use.

Figure 3:
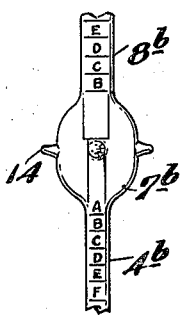
Fig. 3 is a broken fragmentary view illustrating a modification.

As illustrated in Fig. 3, the lower and upper stem portions 4—b and 8—b have the bulbous displacement portion 7—b therebetween, and in this instance the bulbous portion is provided with a series of substantially radially outwardly extending centering and friction reducing points or beads 14.

In the use of my improved hydrometer float element, the scale 6 of the lower stem portion 4 will be employed in connection with ethylene glycol solutions or other solutions heavier than water, and as the stem portion is of relatively small diameter and consequently has a correspondingly small volumetric displacement, the divisions or markings on the scale sheet or portion 6 can be spaced sufficiently far apart to make possible clear and accurate readings, even though the spacing of the divisions be only some four points of specific gravity. The bulbous portion 7 gives volumetric displacement substantially corresponding to the displacement of the portion 7—a, as indicated by the dotted lines in Fig. 2, and in consequence the readings on the upper stem portion 8 will be effective to give desired data without the necessity of having the extreme length of the middle or unused portion of the stem. By making the upper stem portion 8 of larger diameter than the lower stem portion 4, the volumetric displacement of this upper stem portion will be increased, and consequently with an instrument for testing alcohol antifreeze solutions, or other liquid solutions lighter than water, it is possible to hold the division or indicating markings on the scale 10 to shorter intervals or lengths, thus considerably shortening the necessary length of the upper stem portion 8 over the length of the corresponding portion 8—a as illustrated in Fig. 2.

Although I have illustrated and described my improved hydrometer structure particularly as adapted and intended for use in testing radiator anti-freeze solutions, such as ethylene glycol and alcohol, it is obvious that the invention is adaptable for use with other radiator anti-freeze solutions, and with solutions of other characteristics and for other purposes.

While I have herein shown and described only certain specific embodiments of my invention and have suggested only certain possible modifications, it will be appreciated that many changes and variations can be made in the form and construction and the shape or design, as well as in the material from which the parts are made, without departing from the spirit and scope of my invention, which is defined by the appended claims.

I claim:
1. A hydrometer float having an upstanding indicating stem provided with indications in the lower part thereof for testing solutions having a specific gravity greater than water and in the upper part for testing solutions having a specific gravity less than water, said stem having an enlarged displacement portion intermediate the upper and lower measuring portions.

2. A hydrometer float comprising a float bulb portion having an upstanding lower gauge stem carrying scale indications for use in testing heavier liquid solutions and an upper stem portion having indications for use in testing lighter liquid solutions and having a bulbous enlargement intermediate said upper and lower stem portions, the bulbous enlargement having an outside diameter substantially no greater than the outside diameter of the float bulb portion.

3. A hydrometer float element comprising a lower float bulb portion, a small diameter gauge stem upstanding from said float bulb portion, a bulbous displacement portion at the top of the lower stem portion, an upper stem portion extending above the bulbous portion and of greater diameter than the lower stem portion, indicating scale means dividing the lower stem portion for use in testing heavier liquid solutions, and indicating scale means dividing the upper stem portion for use in testing lighter liquid solutions.

4. A hydrometer float element for use in testing the specific gravity of radiator anti-freeze solutions having specific gravity heavier than water and other radiator anti-freeze solutions having specific gravity lighter than water and in which use the specific gravity of a heavier solution for an appreciable amount below the specific gravity of water and a lighter solution for an appreciable amount above the specific gravity of water is immaterial comprising, a float bulb portion weighted at its lower end, a thin lower gauge stem portion rising from the top of said weighted bulb portion, scale displaying means in said lower gauge stem portion for use in testing solutions heavier than water, an enlargement at the upper end of the lower stem portion of sufficient volumetric displacement to compensate for the disregarded limits of specific gravity above and below the specific gravity of water, an upper gauge stem portion rising from said enlarged displacement portion and having its upper end closed, and scale displaying means in said upper gauge stem portion for use in testing solutions lighter than water.

5. A hydrometer float element for use in testing the specific gravity of radiator anti-freeze solutions having specific gravity heavier than water and other radiator anti-freeze solutions having specific gravity lighter than water and in which use the specific gravity of a heavier solution for an appreciable amount below the specific gravity of water and a lighter solution for an appreciable amount above the specific gravity of water is immaterial comprising, a float bulb portion weighted at its lower end, a thin lower gauge stem portion rising from the top of said weighted bulb portion, scale displaying means in said lower gauge stem portion for use in testing solutions heavier than water, an enlargement at the upper end of the lower stem portion of sufficient volumetric displacement to compensate for the disregarded limits of specific gravity above and below the specific gravity of water, an upper gauge stem portion rising from said enlarged displacement portion and having its upper end closed, and scale displaying means in said upper gauge stem portion for use in testing solutions lighter than water, the enlarged displacement portion of the stem having an outside diameter substantially no greater than the float bulb portion whereby the hydrometer float element can be used in a liquid and float receiving barrel of an ordinary syringe type of hydrometer.

6. A hydrometer float element for use in testing the specific gravity of radiator anti-freeze solutions having specific gravity heavier than water and other radiator anti-freeze solutions having specific gravity lighter than water and in which use the specific gravity of a heavier solution for an appreciable amount below the specific gravity of water and a lighter solution for an appreciable amount above the specific gravity of water is immaterial comprising, a float bulb portion weighted at its lower end, a lower gauge stem portion rising from the top of said weighted bulb portion, scale displaying means in said lower gauge stem portion for use in testing solutions heavier than water, an enlargement at the upper end of the lower stem portion of sufficient volumetric displacement to compensate for the disregarded limits of specific gravity above and below the specific gravity of water, an upper gauge stem portion rising from said enlarged displacement portion and having its upper end closed, scale displaying means in said upper gauge stem portion for use in testing solutions lighter than water, and laterally extending centering and friction reducing points on the enlarged portions of the float element, the enlarged displacement portion of the stem having an outside diameter substantially no greater than the outside diameter of the float bulb portion taken through the centering and friction reducing points.

LEO EDELMANN.